United States Patent
Tangeman et al.

(10) Patent No.: US 12,526,007 B2
(45) Date of Patent: Jan. 13, 2026

(54) MANUALLY-POWERED MOBILE TELEPHONE

(71) Applicants: Stanton Tangeman, San Francisco, CA (US); Yugen Lockhart, Palo Alto, CA (US)

(72) Inventors: Stanton Tangeman, San Francisco, CA (US); Yugen Lockhart, Palo Alto, CA (US)

( * ) Notice: Subject to any disclaimer, the term of this patent is extended or adjusted under 35 U.S.C. 154(b) by 850 days.

(21) Appl. No.: 17/857,647

(22) Filed: Jul. 5, 2022

(65) Prior Publication Data

US 2023/0010000 A1 Jan. 12, 2023

Related U.S. Application Data

(60) Provisional application No. 63/219,024, filed on Jul. 7, 2021.

(51) Int. Cl.
| | | |
|---|---|---|
| *H04B 1/3883* | (2015.01) | |
| *H04B 1/04* | (2006.01) | |
| *H04B 1/16* | (2006.01) | |

(52) U.S. Cl.
CPC ............ *H04B 1/3883* (2013.01); *H04B 1/04* (2013.01); *H04B 1/1607* (2013.01)

(58) Field of Classification Search
CPC ...... H04B 1/3883; H04B 1/04; H04B 1/1607; H04W 4/70; H04W 4/80; H02J 7/1423; H02J 7/1492; H02S 40/32; B60L 1/00; B60L 53/53; B60L 53/55; B60L 2210/30; B60L 2210/40
See application file for complete search history.

(56) References Cited

U.S. PATENT DOCUMENTS

| | | |
|---|---|---|
| 6,322,233 B1 | 11/2001 | Brandt |
| 6,614,781 B1 | 9/2003 | Elliott et al. |
| (Continued) | | |

FOREIGN PATENT DOCUMENTS

WO 0131764 A1 5/2001

OTHER PUBLICATIONS https://www.coroflot.com/stawsky/Ring-of-the-Power (6 pages).
https://www.amazon.com/stores/Zeus+Dynamo/page/278EFFC4-559C-4A7C-B6AC-C3251268EC1C?ref_=ast_bln (4 pages).

*Primary Examiner* — Lana N Le
(74) *Attorney, Agent, or Firm* — Aurora Consulting LLC; Ashley Sloat

(57) ABSTRACT

Embodiments of a manually-powered communication device such as a cellular mobile telephone, a satellite phone, or a walkie-talkie include a manually operable crank; a dynamo flywheel generator arranged to receive energy input from the manually operable crank; a low wattage power supply, such that the power supply is operably connected to the dynamo flywheel generator and receives energy therefrom; a capacitor with a buffer that comprises a power storage capacity sufficient to operate the mobile telephone without continuous manual input, the capacitor receiving energy from the power supply; a processor operably connected to the capacitor and able to receive energy therefrom; and a modem that is operably connected to the processor and arranged to receive energy therefrom. The crank, the generator, and the capacitor are all included in a power unit portion of the device; the power supply, processor, and modem are included in a main body of the device.

20 Claims, 16 Drawing Sheets

(56) References Cited

U.S. PATENT DOCUMENTS

| | | |
|---|---|---|
| 6,914,340 B2 | 7/2005 | Becker et al. |
| 7,049,708 B2 | 5/2006 | Hartman et al. |
| 7,400,051 B2 | 7/2008 | Pang |
| 7,822,188 B1 | 10/2010 | Kirchhoff et al. |
| 8,585,236 B2 | 11/2013 | Tangeman et al. |
| 8,880,580 B2 | 11/2014 | Simmons et al. |
| 9,277,049 B1 | 3/2016 | Danis |
| 10,542,140 B1 | 1/2020 | Tang et al. |
| D954,720 S | 6/2022 | Tang et al. |
| D960,851 S | 8/2022 | Tang et al. |
| 2002/0098831 A1 | 7/2002 | Castell et al. |
| 2002/0153998 A1* | 10/2002 | Litwin .............. H04B 3/54 |
| 2004/0090070 A1 | 5/2004 | Eisenbraun |
| 2004/0172254 A1 | 9/2004 | Sharma et al. |
| 2005/0026643 A1* | 2/2005 | White .............. H04B 1/04 |
| | | 455/575.1 |
| 2006/0033809 A1 | 2/2006 | Farley |
| 2006/0168095 A1 | 7/2006 | Sharma et al. |
| 2006/0245182 A1 | 11/2006 | Lee |
| 2006/0268833 A1 | 11/2006 | Yardley |
| 2007/0027921 A1 | 2/2007 | Alvarado et al. |
| 2007/0233615 A1 | 10/2007 | Tumminaro |
| 2007/0244811 A1 | 10/2007 | Tumminaro |
| 2008/0130554 A1 | 6/2008 | Gisby et al. |
| 2009/0215438 A1 | 8/2009 | Mittal et al. |
| 2010/0182921 A1 | 7/2010 | Basart et al. |
| 2010/0220850 A1 | 9/2010 | Gisby et al. |
| 2011/0096762 A1 | 4/2011 | Basart |
| 2017/0188207 A1 | 6/2017 | Chien |
| 2018/0014168 A1 | 1/2018 | Lau et al. |
| 2018/0062397 A1* | 3/2018 | Singh .............. H04B 1/16 |
| 2018/0338027 A1* | 11/2018 | Sung .............. H04B 1/3883 |
| 2023/0208483 A1* | 6/2023 | Cha .............. H04B 1/04 |
| | | 455/522 |

\* cited by examiner

MANUALLY-POWERED MOBILE TELEPHONE

CROSS-REFERENCE TO RELATED APPLICATIONS

This application claims the priority benefit of U.S. Provisional Patent Application Ser. No. 63/219,024, filed Jul. 7, 2021, the contents of which are herein incorporated by reference in their entirety.

TECHNICAL FIELD

This application is directed to technologies for manually-powered energy storage and delivery devices.

BACKGROUND

Mobile electronic devices require power to operate, and are typically powered by batteries, with an option to derive power from an external source. The requirement for batteries or an external power source can pose constraints on the actual operability of the devices in remote locations. Manually-cranked devices, such as those that can power mobile phones to any degree, typically charge an internal battery, and then release power from the battery. Batteries provide charging transfer power slowly and inefficiently, and struggle to meet the high power requirements of current smartphones.

There is a need in the market for mobile electronic devices that can operate independently both of batteries and external power, deriving power, instead, from manual input of kinetic energy. Embodiments of a manually-powered mobile telephone, as provided herein, resolve the deficiencies of conventional devices, as noted above.

SUMMARY OF THE TECHNOLOGY

Embodiments of the technology are directed to a manually-powered 2-way radio communication device that is capable of internally generating its own electrical power via a kinetic dynamo generator that is hand-cranked by a user. User-applied manual kinetic input is fully sufficient as a power source; neither a conventional electrical storage battery nor an external power source are required. The device can operate continuously and indefinitely at power levels below the kinetic generator input, without a need to cease communication operation due to depletion of the generator capability. The dynamo has a sufficient capacitor buffer within the circuitry to allow for communication operation to occur for a period of time without kinetic energy input; a unit of kinetic input time produces about twice that amount of operating time. Stated another way, kinetic input time is only required for about 30% of the device operating time. The device features an internet of things (IOT)-style system design, including a microprocessor, that operates well below a dynamo output range. The low power requirement of the communication device is typically no more than 1 watt for a cellular phone connection, and no more than 2 watts for a low orbital satellite connection.

DETAILED DESCRIPTION

Figure 1:
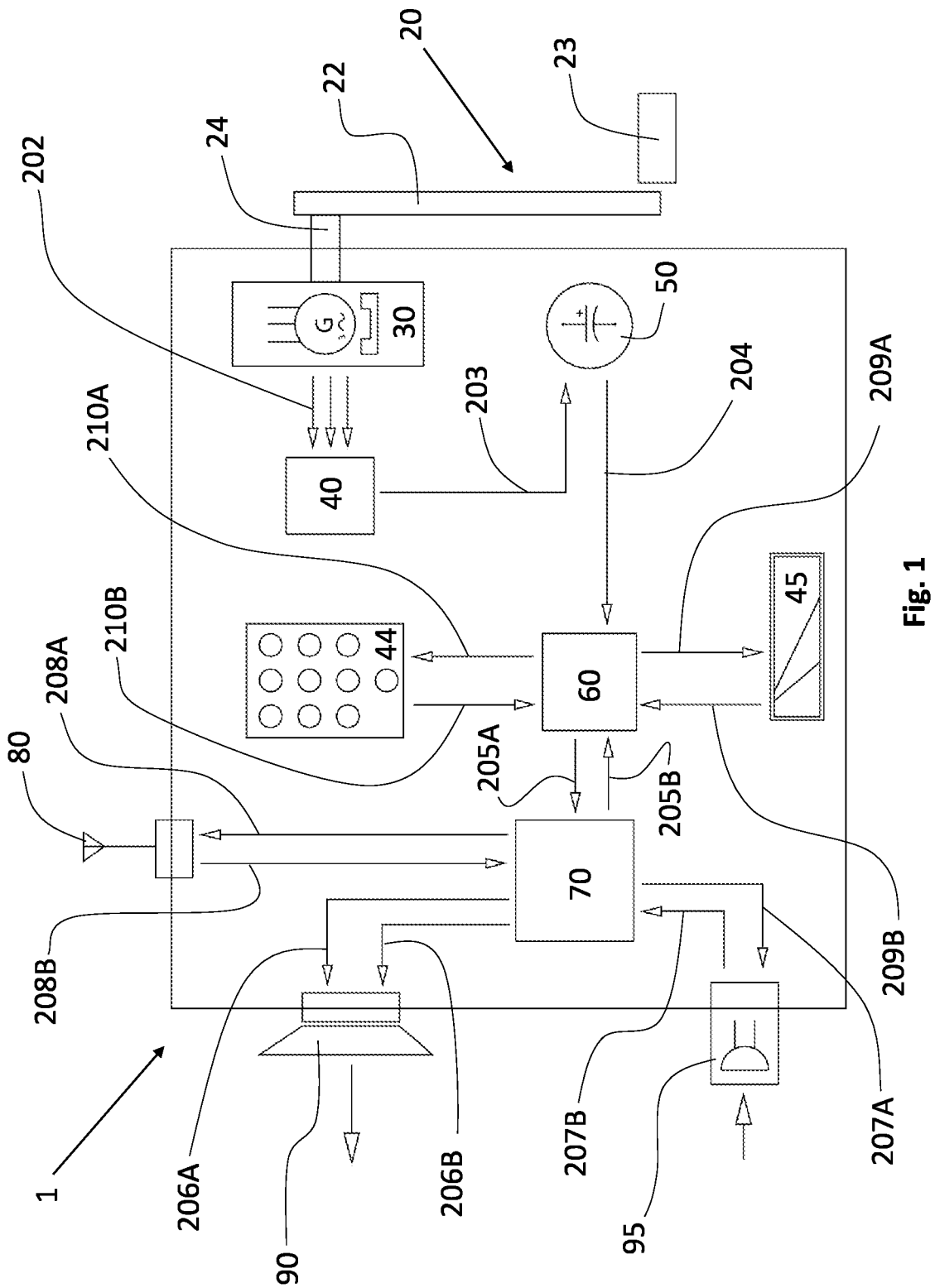
FIG. 1 is block diagram of an embodiment of a manually-powered 2-way radio communication device, with a focus on the flow of energy from manual input to communication operations.
Figure 2:
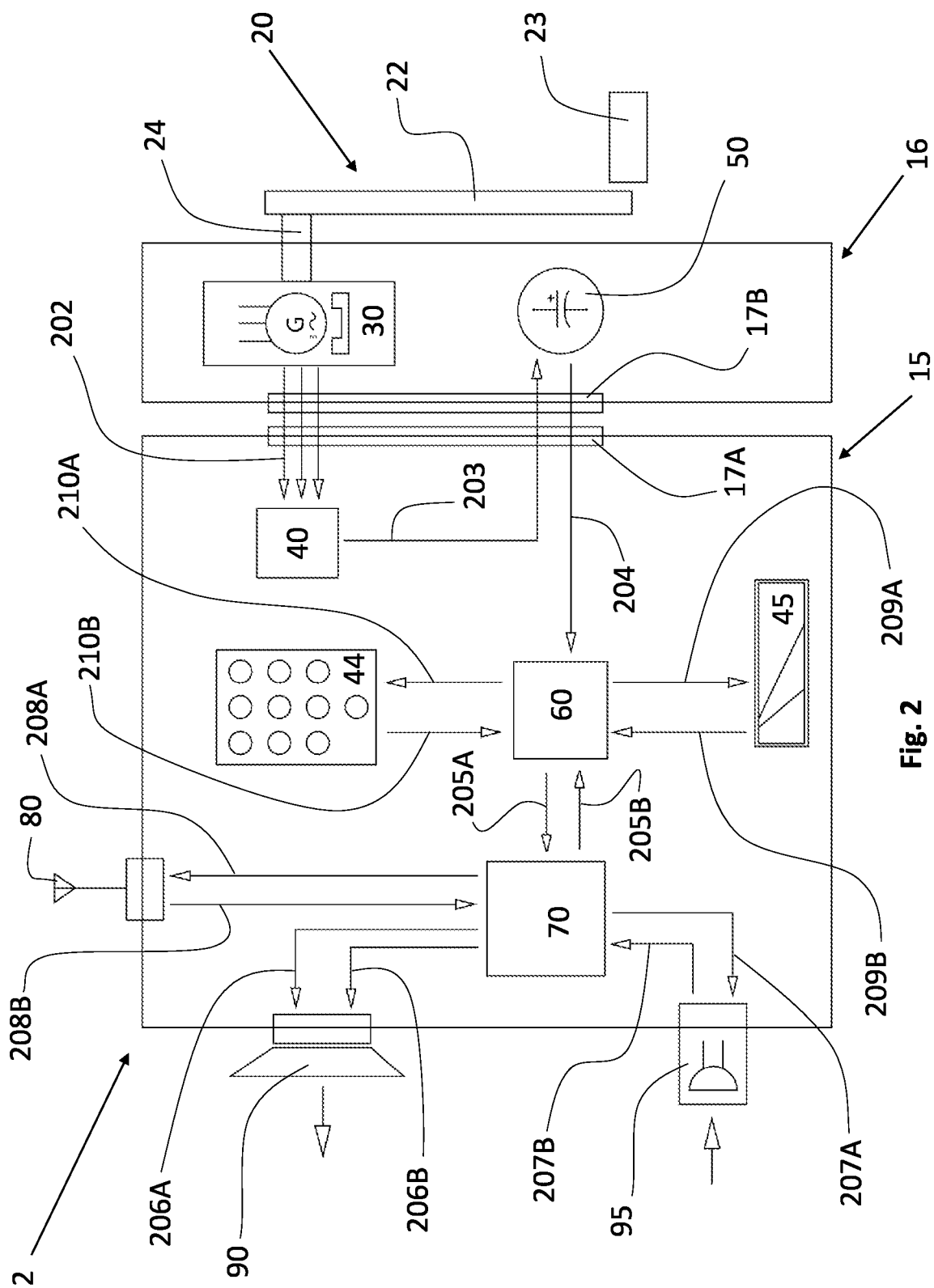
FIG. 2 is block diagram of an embodiment of a manually-powered 2-way radio communication device in which a main body and a power unit are separable (and referred to as a separable and modular embodiment) with a focus on the flow of energy from manual input to communication operations.

Among the embodiments of a manually-powered 2-way radio communication device (for convenience this may be referred to simply as a "communication device"). In embodiments depicted in FIGS. 1A-5C, the same elements have the same numbers throughout. Two embodiments will be described in detail. In a first communication device embodiment 1 (FIG. 1), the device includes all components, integrated within a single housing. In a second communication device embodiment 2 (FIG. 2), the device includes two mateable and separable pieces, a main body 15 and a power unit 16. When the power unit 16 and main body 15 of communication device 2 are connected, the second device embodiment 2 is functionally equivalent to the first embodiment (communication device 1). FIGS. 1-2 are block diagrams of the first and second embodiments of a 2-way way radio communication device, respectively, with a focus on the flow of energy from human user-driven manual or kinetic input via the crank to provide power for the various communication operations of each device. Both communication devices 1 and 2, by way of example, may take the form of a cellular mobile telephone, a satellite phone, a walkie-talkie, or the like.

FIG. 1 is block diagram of an embodiment of a manually-powered 2-way radio communication device 1 (may be referred to simply as a "communication device"), with a focus on the flow of energy from manual input to communication operations. Components of this embodiment of the device include a crank 20, a dynamo generator 30, a power supply 40, an input device 44, a supercapacitor 50, a microprocessor 60, a modem 70, an antenna 80, a speaker 90, a microphone 95, an input device 44, and a display 45. The communication device 1 does not include a battery. In some embodiments of communications device 1, display 45 may be optional. Input device 44 is depicted as a keypad herein, but may take a form other than the particular keypad form depicted herein. Further aspects and features of communication device 1 are depicted in FIGS. 3A-5C.

Flow of energy follows a path from kinetic input from crank 20 through dynamo generator 30, through AC-to-DC rectification within power supply 40, to supercapacitor 50, to microprocessor 60, and to modem 70. In some embodiments, microprocessor 60 is an 8-bit low power microprocessor. Flow of energy from generator 30 to power supply 40 is depicted by three arrows that represent three distinct wave forms, which are rectified into downstream DC current. Input device 44 provides user-originated input into microprocessor 60.

From modem 70, energy is variously directed to an antenna 80, a speaker 90, and microphone 95. Signals from antenna 80 and microphone 95 also flow back to modem 70, and then back to microprocessor 60. Signals from modem 70 also flow back to supercapacitor 50. Neither communication device 1 nor communication device 2 includes a battery, batteries being much slower to charge than a supercapacitor.

FIG. 2 is block diagram of an embodiment of a manually-powered 2-way radio communication device 2 in which a main body 15 and a power unit 16 are separable from each other. FIG. 2, like FIG. 1, also focuses on the flow of energy from manual input to communication operations. Further aspects and features of communication device 2 are depicted in FIGS. 3A-5C.

Main body 15 of manually-powered 2-way radio communication device 2 includes power supply 40, microprocessor 60, modem 70, antenna 80, speaker 90, microphone 95, input device 44, display 45, and electrical interface connector 17A. The flow of energy from generator 30 to power supply 40 is depicted by three arrows that represent three distinct wave forms, which are rectified into downstream DC current. Input device 44 provides user-originated input into microprocessor 60. Power unit 16 of manually-powered 2-way radio communication device 2 includes crank 20, flywheel dynamo generator 30, supercapacitor 50, and electrical interface connector 17B. In some embodiments of communications device 2, display 45 may be optional. Input device 44 is depicted as a keypad herein, but may take a form other than the particular keypad form depicted herein. Further aspects and features of communication device 1 are depicted in FIGS. 3A-5C.

The separability of main body 15 and power unit 16 creates a modular aspect to device 2 embodiments in that power unit 16 (mateable to main body 15) may also mateable with a suitably configured main body of a second manually-powered 2-way radio communication device (not shown). The main body of the second device may be identical or similar in form to the main body 15, or it may be a second type of manually-powered 2-way radio communication device. When power unit 16 is connected to the main body of a suitable second device, the resulting or assembled manually-powered 2-way radio communication device, merely by way of example, may take the form of a cellular mobile telephone, a text messaging-only cellular or satellite phone, a satellite phone, a walkie-talkie, or the like.

Both embodiment 1 (integral embodiment, FIG. 1) and embodiment 2 (separable or modular embodiment, FIG. 2) of the manually powered 2-way radio communication device may include any of Bluetooth communication capability, global positioning satellite communication capability, or internet access capability. Embodiment 1 (integral embodiment, FIG. 1) and embodiment 2 (separable or modular embodiment, FIG. 2) of the manually powered 2-way radio communication device may include any of audio-based communication and/or text-message based communication. Some embodiments may include only text-message based communication to the exclusion of audio-based communication. Some of the text message-based communication embodiments may include the capability to translate received text messages into audio speech.

Flow of energy in manually-powered 2-way radio communication device 1 and communication device 2 (when main body 15 and power unit 16 are connected to each other) follows a path through the both devices in a manner very similar. In both devices, energy originates with kinetic input from crank 20 that is captured by flywheel dynamo generator 30 (both within power unit 16).

In communication device 1, energy flows directly from flywheel dynamo generator 30 to power supply 40 and then to supercapacitor 50, and then to microprocessor 60.

In communication device 2, from flywheel dynamo generator 30, energy crosses into main body 15 (through connectors 17A and 17B) where it enters into power supply 40. Energy next returns to power unit 16 (through connectors 17A and 17B), and then into supercapacitor 50. From supercapacitor 50, energy flows back to main body 15 (through connectors 17A and 17B), and then into microprocessor 60.

In both communication devices 1 and 2, energy flows from microprocessor 60 into modem 70, energy flows into input device 45, into input device 44, and into modem 70. From modem 70, energy is variously directed to antenna 80, speaker 90, input device 45, and microphone 95. Signals from antenna 80 and microphone 95 also flow back to modem 70, and then back to microprocessor 60. Communication device 2 does not include a battery.

The following is a summary of the labeled power or energy flow paths (upstream to downstream) and signal flow paths (upstream variously to modem 70 and to microprocessor 60), as described above:

power paths 202 (generator 30 to power supply 40),
power path 203 (power supply 40 to supercapacitor 50),
power path 204 (supercapacitor 50 to microprocessor 60),
power path 205A (microprocessor 60 to modem 70),
incoming data signal path 205B (modem 70 to microprocessor 60), power path 206A (modem 70 to speaker 90),
incoming signal path 206B (speaker 90 to modem 70),
external audio output signal path 206C (speaker 90),
power path 207A (modem 70 to microphone 95),
incoming audio signal path 207B (microphone 95 to modem 70),
power path 208A (modem 70 to antenna 80),
incoming radio signal path 208B (antenna 80 to modem 70),
power path 209A (microprocessor 60 to input device 45),
optional incoming touch screen signal path 209B (input device 45 to microprocessor 60),
circuit completing power path 210A (microprocessor 60 to keypad 44), and
incoming keypad signal 210B (keypad 44 to microprocessor 60).

A summary that focuses on energy flow downstream from its origin to the operating functions of communication devices 1 and 2 now follows. Flow of energy originates with manual cranking of crank 24 and kinetic energy input into dynamo flywheel generator 30. Electrical energy emerges from dynamo flywheel generator 30 in three separate phases and enters 3-phase AC/DC power supply 40, in which it is rectified into single DC current. From power supply 40 energy flows to supercapacitor 50. From supercapacitor 50 energy flows outward in three directions variously to input device 44, display 45, and modem 70. From modem 70, energy flows in three directions variously to speaker 90, to antenna 80, and to microphone 95.

Setting aside the compartmentalization of components into main body 15 and power unit 16 and the energy flow path across connectors 17A and 17B, in communication device embodiment 2, the patterns of energy and signal flow within manually-powered 2-way radio communication device 2 (the separable, modular embodiment) are substantially the same as the analogous patterns in manually-powered 2-way radio communication device 1 (the integral embodiment). In a variation (not shown) of separable communication device 2, supercapacitor 50 may be located in main body 15, rather than in power unit 16.

Various components of manually-powered 2-way radio communication devices (1 and 2) collectively contribute to the energy efficiency and low power requirements of the communication device. Generator 30, because of its dynamo flywheel character, is highly efficient at capturing kinetic input from crank 20. Power supply 40 is typically a 3-phase AC/DC unit. Microprocessor 60 is typically an 8-bit low power unit. Modem 70 is a low power unit. Supercapacitor 50, different than conventional capacitors, is particularly significant in minimizing power requirements of communication devices 1 and 2.

A supercapacitor (also called an ultracapacitor) has a high-capacity with a capacitance value much higher than conventional capacitors, but with lower voltage limits, these features bridge the gap between electrolytic capacitors and rechargeable batteries. A supercapacitor typically stores 10 to 100 times more energy per unit mass than electrolytic capacitors, can accept and deliver charge much faster than batteries, and tolerates many more charge and discharge cycles than rechargeable batteries. Supercapacitors are commonly used in applications requiring many rapid charge/discharge cycles, rather than long-term compact energy storage. Unlike ordinary capacitors, supercapacitors do not use a conventional solid dielectric; rather, they use electrostatic double-layer capacitance and electrochemical pseudo-capacitance, both of which contribute to the total capacitance of the capacitor.

By way of example with regard to the functionality of supercapacitor 50, the communication device embodiments (1 and 2), as provided herein, typically can charge within less than two minutes of manual crank input. The discharge rate of supercapacitor 50 is within the range of ten to thirty minutes during an active call on the communication device. If a call lasts longer than the ten to thirty minutes discharge period, the communication device can be quickly recharged via crank on-the-fly, allowing for an infinitely long, sustainable voice call. However, calls based from device embodiments 1 and 2 are typically short and to-the-point, and thus needing to crank the device to continue beyond ten to thirty minutes may not typically be necessary. Among the features of device embodiments 1 and 2, the low quick charge rate and shallow discharge rate of supercapacitor 50 contribute to the absence of the otherwise necessity to design and deploy ultra-low custom chips to achieve the functionality of communication device embodiments provided herein.

By way of comparison of communication device embodiments as provided herein, a conventional low power flip phone with a depleted battery, and powered by a generic hand crank, cannot similarly sustain a call. For example, a low power flip phone, with a hand crank, could be hand crank-powered for one to two minutes, after which the phone might turn on, but the user would have to continually keep cranking while on a call, or might not even be able to keep up with power requirements and thus lose the call. In a loss-of-call instance, a user of a conventional phone would be forced to use a generic crank to charge the phone's battery for ten minutes or more to get enough battery power to make a long call.

Microprocessor 60 includes bare metal firmware, a subset of software code written in objective C language. For a given application, in most instances, a bare-metal implementation has a low boot time, a lower hardware resource requirement, runs faster, and uses less memory than a real time operating system, as used, for example, by Android or Apple's operating system, which require complex software running in a stack. Thus, bare metal implementation, by comparison, is power-efficient. This is because operating systems need significant execution time and memory space to run, and these are not needed on a bare-metal configuration. For instance, any hardware feature that includes inputs and outputs are directly accessible on bare-metal, whereas the same feature using an operating system must route the call to a subroutine, consuming running time and memory.

In brief, radio communication device embodiments provided herein yield high operating time to crank time ratios. With radio communicating starting at 3.8V, time to loss of communication power (about 2.8V) is about twelve minutes. With a crank time of about two minutes, this is a 6/1 ratio of operating time to charge time. This ratio could go to 10/1 or more with the addition of further low-power design techniques and lower power chip fabrication processes.

Figure 3A:
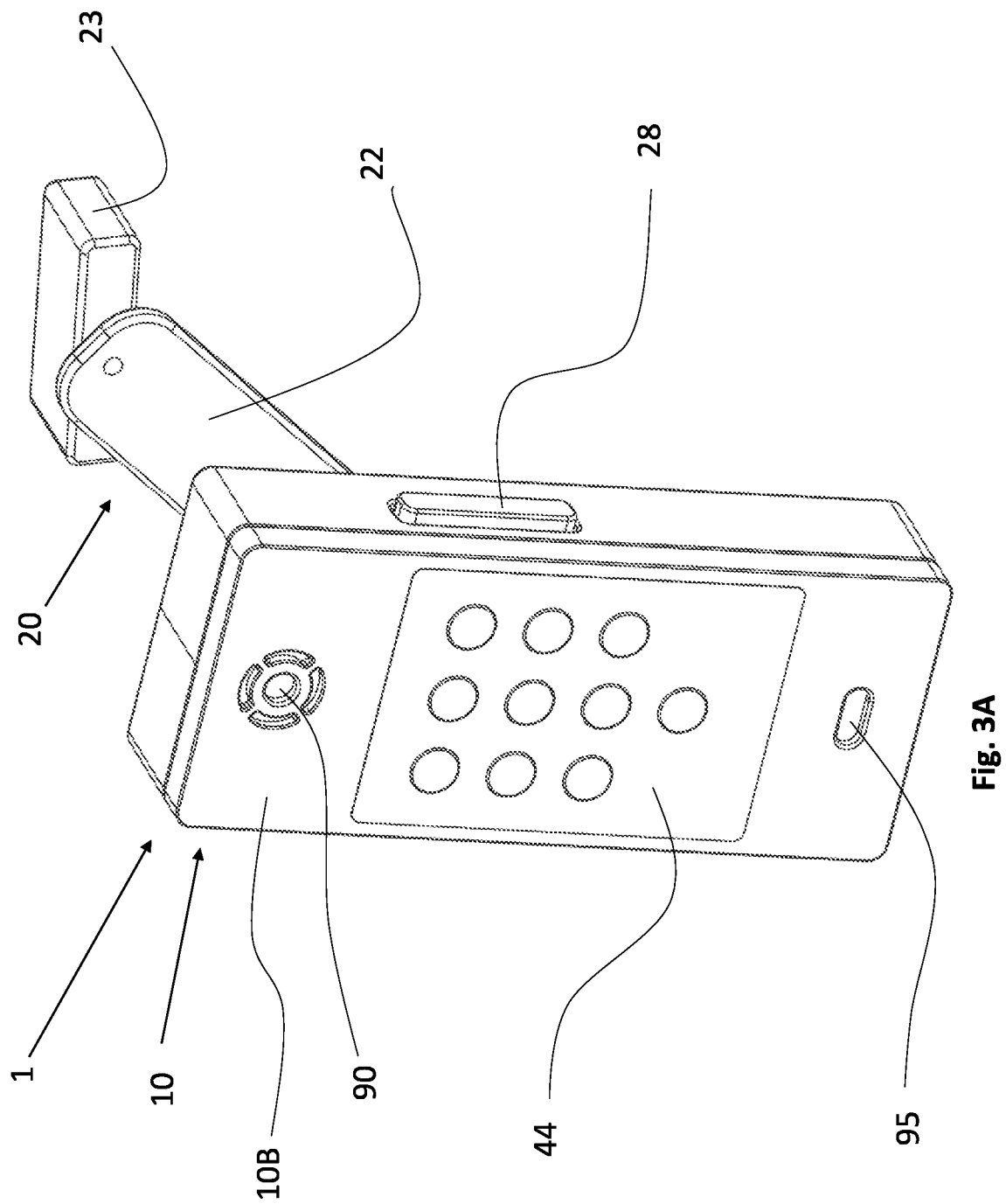
FIG. 3A is a front perspective view of an embodiment of a manually-powered 2-way radio communication device, all components of the device within a housing.
Figure 3B:
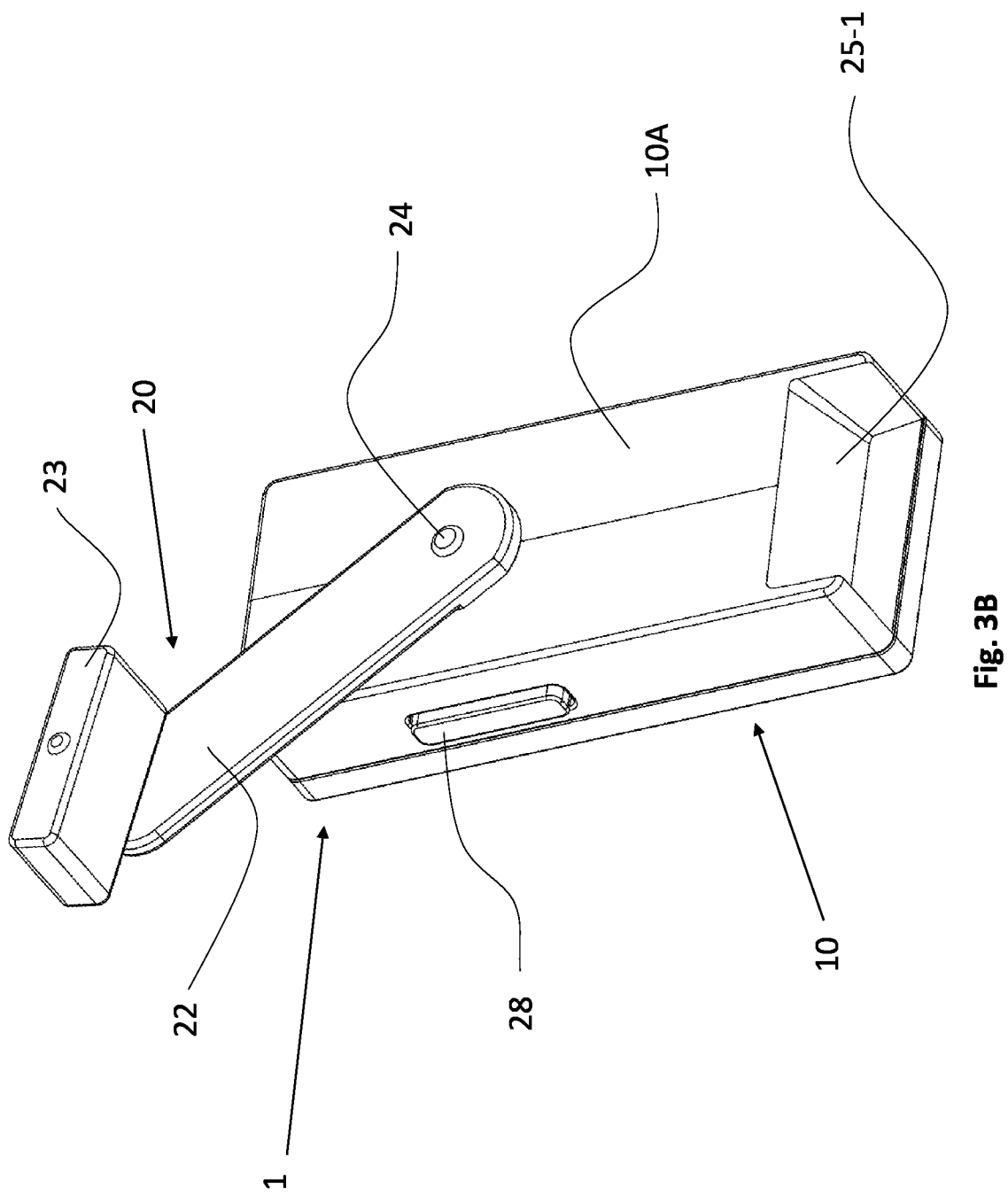
FIG. 3B is a back perspective view of a manually-powered 2-way radio communication device, all components of the device within a housing.
Figure 3C:
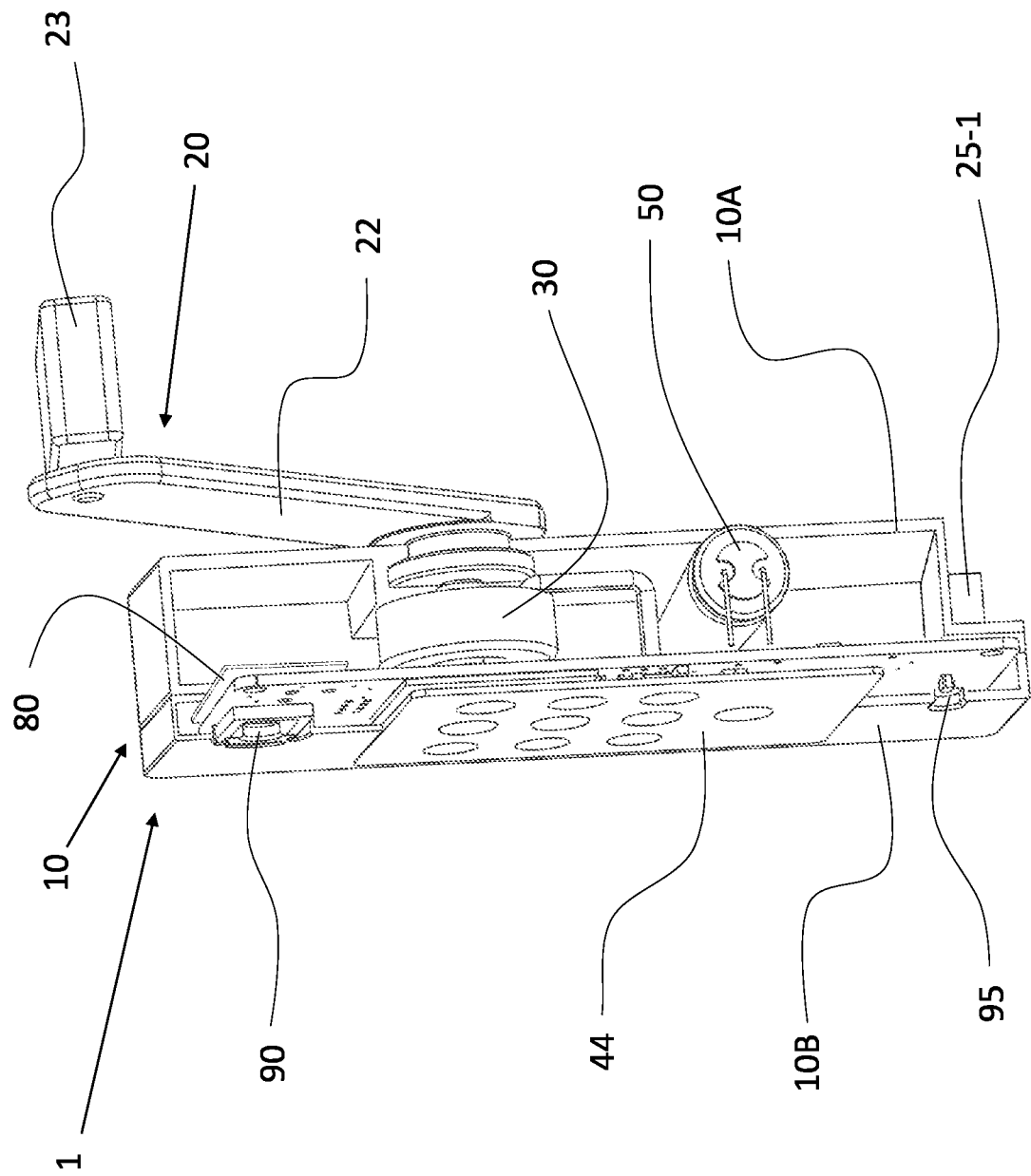
FIG. 3C is an exposed side perspective view of a manually-powered 2-way radio communication device, all components of the device within a housing.
Figure 3D:
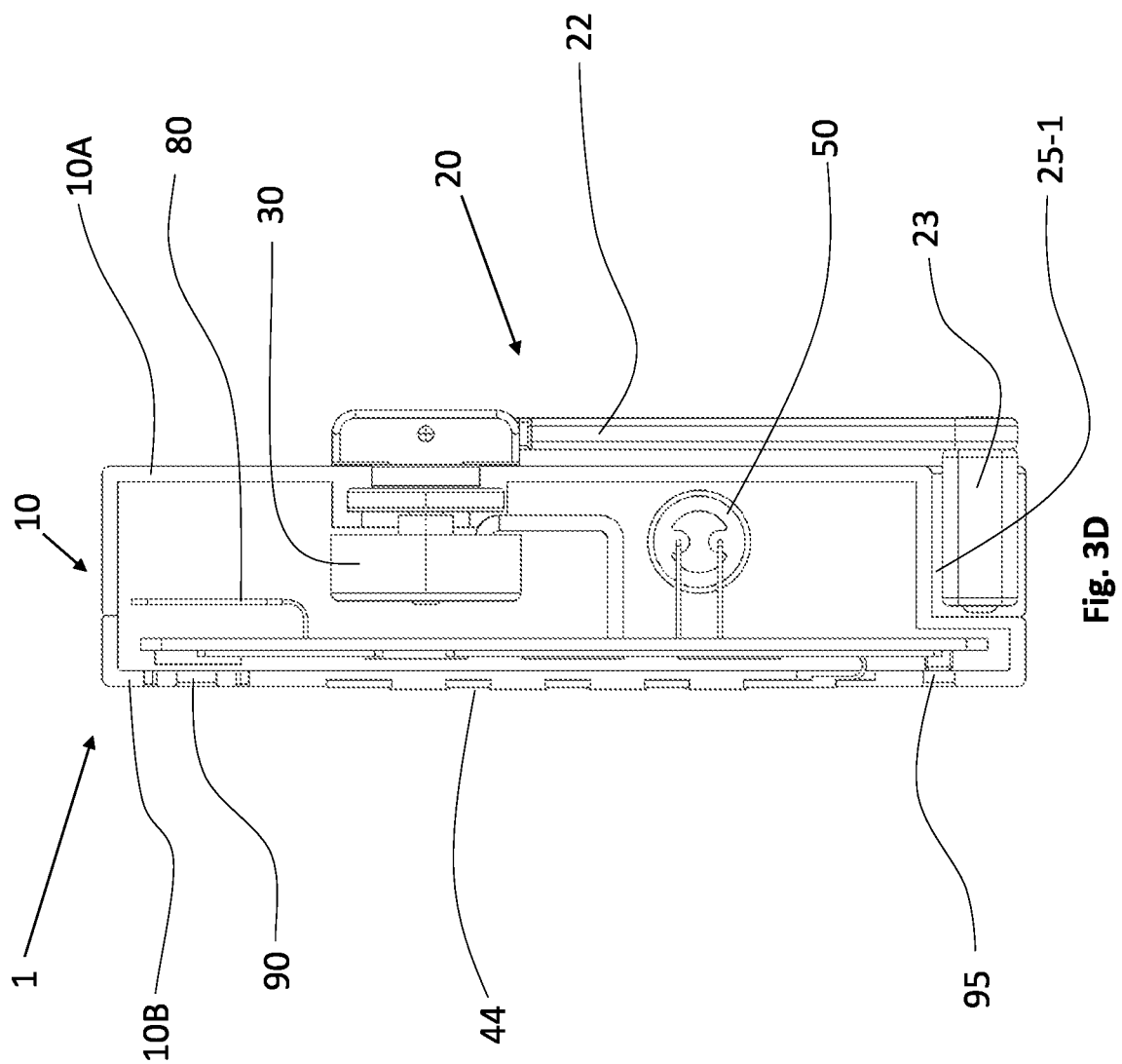
FIG. 3D is an exposed side view of a manually-powered 2-way radio communication device, all components of the device within a housing.
Figure 3E:
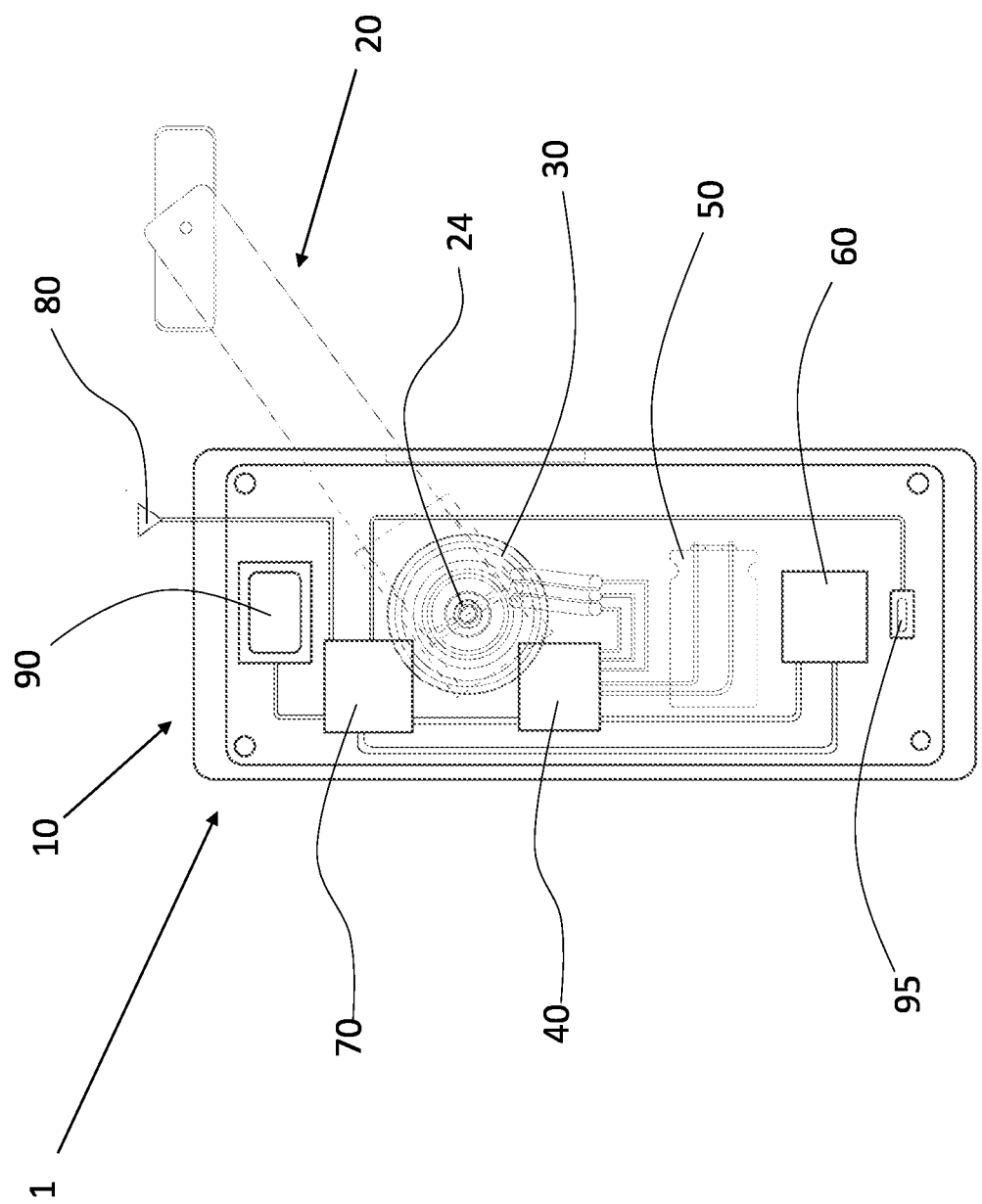
FIG. 3E is an exposed front view of a manually-powered 2-way radio communication device, all components of the device within a housing.

FIGS. 3A-3E show various surface views of the first embodiment of a manually powered 2-way radio communication device 1, components of the device contained within, insertable within, or engaged to a housing 10. This embodiment may also be referred to as an integral embodiment. FIGS. 3A-3B are front and back perspective views, respectively, of manually powered 2-way radio communication device 1. FIGS. 3C, 3D, and 3E are, respectively, an exposed side perspective view (FIG. 3C), an exposed side view (FIG. 3D), and a front transparent view (FIG. 3E) of manually powered 2-way radio communication device 1.

FIG. 3A shows a front perspective view of communication device 1, with the crank handle 20 in a mid-crank position. Crank 20 includes arm 22 and handle 23, and axle 24. FIG. 3B shows a rear perspective of view of communication device 1, with crank 20 in the same position as in FIG. 3A. Also shown are speaker 90, microphone 95, and multi-function button 28, which may variously serve as any one or more of an on/off switch, a communication function switch (e.g., as in a walkie talkie), a volume switch, or a light switch).

FIG. 3C is an exposed or cutaway side view of communication device 1. This view shows crank 20 as it engages flywheel dynamo generator 30 and supercapacitor 50. Housing 10 has a front face 10B and a back face 10A.

FIG. 3D, a side-exposed or cut-away view, shows housing front face 10B on the left and back housing face 10A on the right, along with crank handle 20. Crank arm handle 22 is rotatably mounted on an end of crank arm 22. Crank 20 is in a resting position along back housing face 10A. Crank handle 23 is tucked into a handle stowage site 25-1 within housing back face 10A.

FIG. 3E is an exposed front face view of communication device 1. Crank 20, in a mid-crank position is shown in the background, the base of which can be seen engaging flywheel dynamo generator 30. Further shown within the interior of communication device 1 are power supply 40, supercapacitor 50, and modem 70. Antenna 80, speaker 90, and microphone 95 are shown as being connected to modem 70.

FIGS. 4A-4F show various views of a modular or separable embodiment of manually powered 2-way radio communication device 2. In this embodiment, main body 15 and power unit 16 are separable. Power unit 16 of this embodiment is configured to be able to connect with the main body of another compatibly-configured manually powered 2-way radio communication device, thereby giving communication device embodiment 2 a modular quality.

Figure 4A:
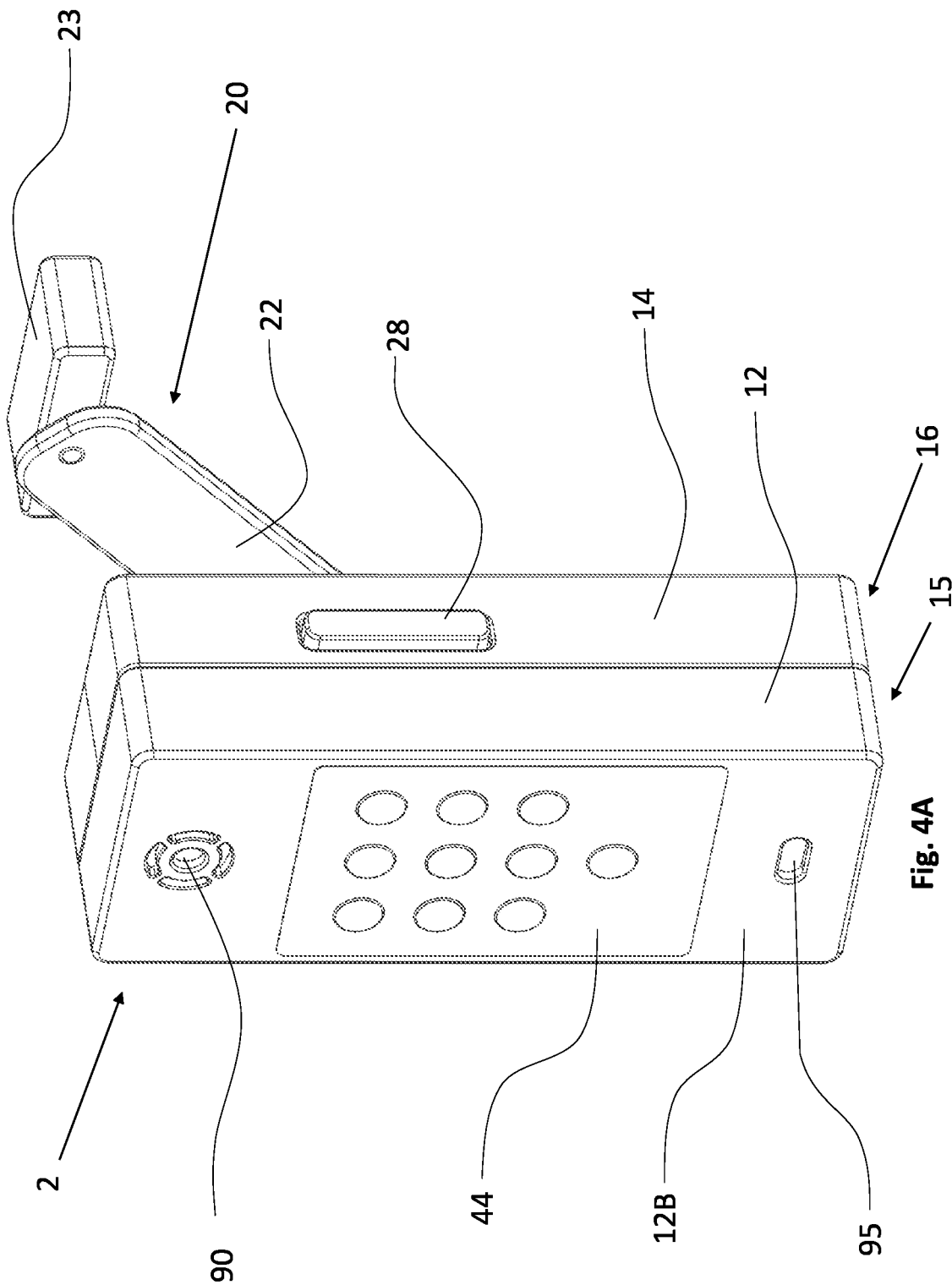
FIG. 4A is a front perspective view of an embodiment of a manually-powered 2-way radio communication device, the device arranged into a main body and a power unit.
Figure 4B:
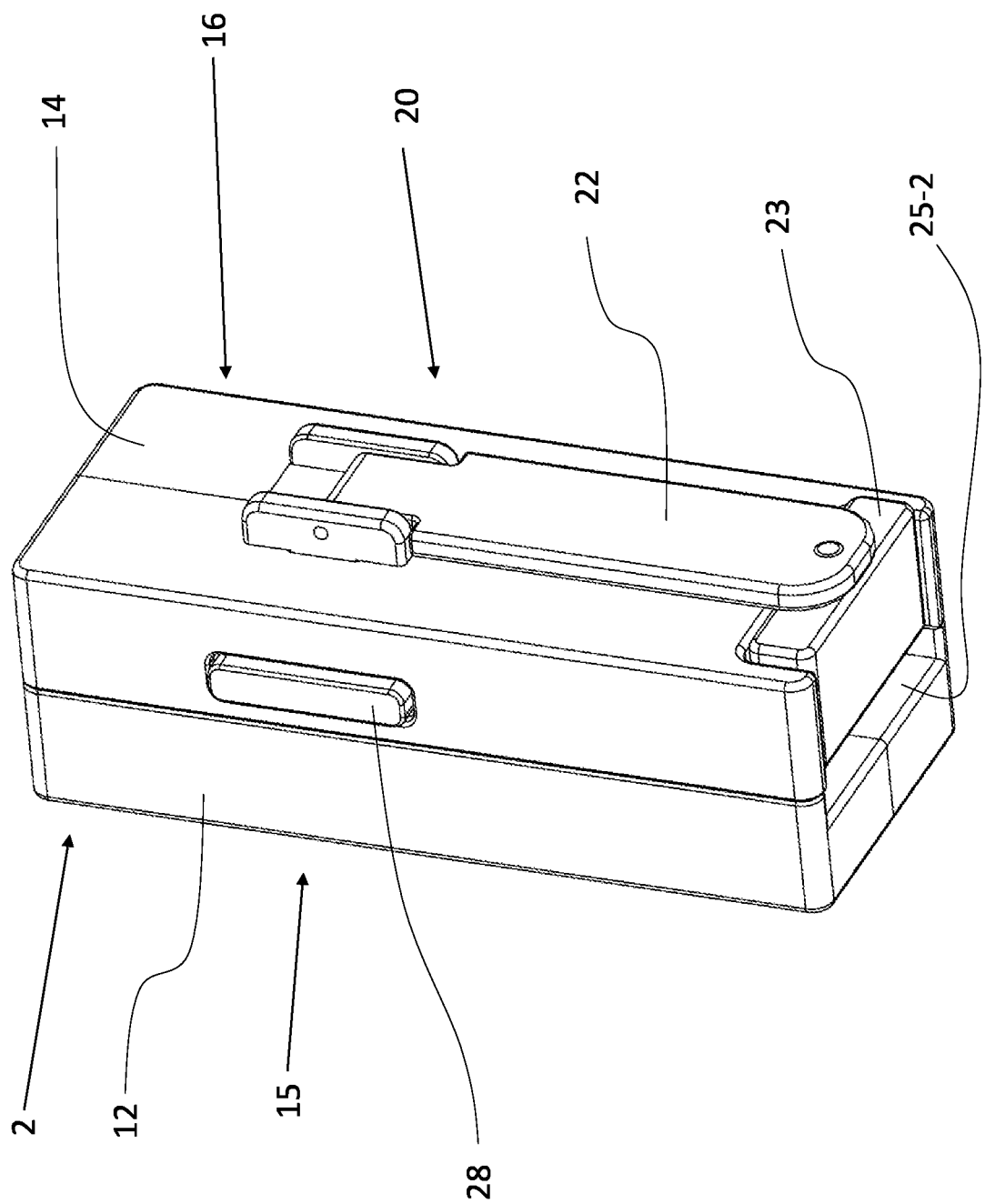
FIG. 4B is a back perspective view of a manually-powered 2-way radio communication device, the device arranged into a main body and a power unit.

FIGS. 4A-4B are, respectively, a front perspective view (FIG. 4A) and a back perspective view (FIG. 4B) of an embodiment of manually powered 2-way radio communication device 2, the device is arranged into a main body 15 and a power unit 16 that are separable from each other. FIG. 4A shows crank 20 in a working position. FIG. 4B shows the crank in a resting position, with handle 23 tucked into stowage site 25-2 within housing 12 of power unit 16.

Figure 4C:
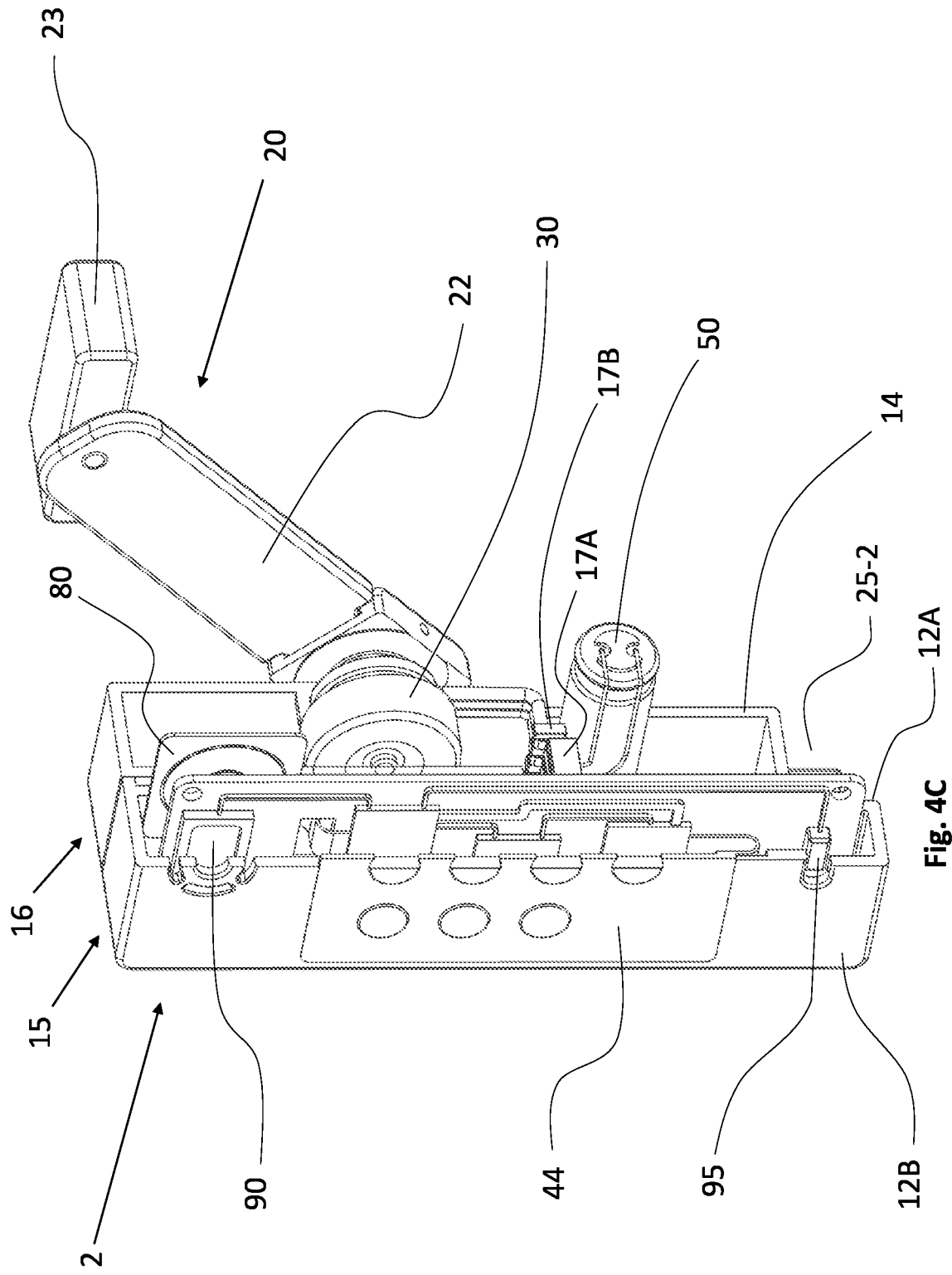
FIG. 4C is an exposed side perspective view of a manually-powered 2-way radio communication device, the device arranged into a main body and a power unit.
Figure 4D:
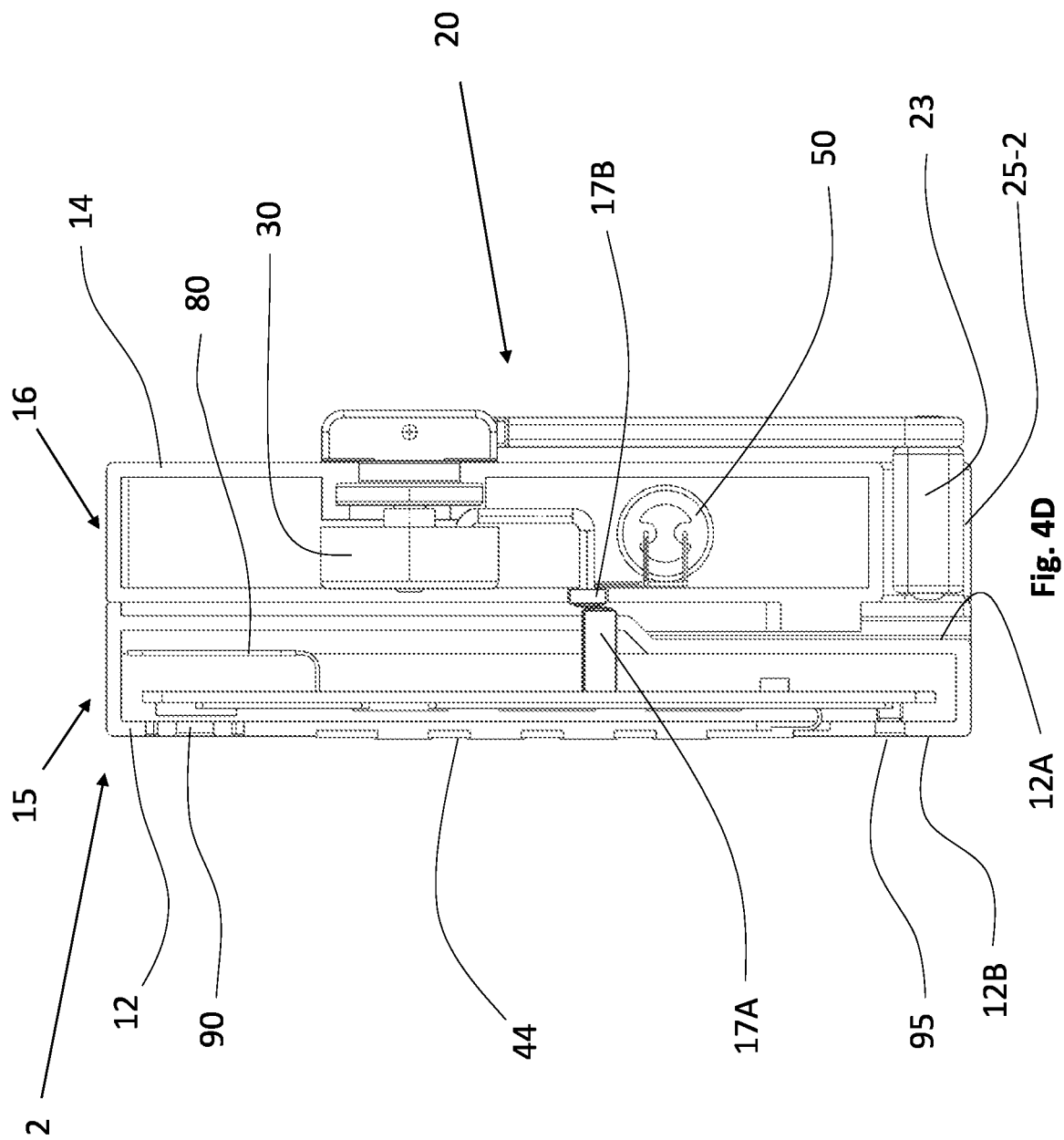
FIG. 4D is an exposed side view of a manually-powered 2-way radio communication device, the device arranged into a main body and a power unit.

FIGS. 4C-4D are, respectively, an exposed side perspective view (FIG. 4C) and an exposed side view (FIG. 4D) of manually powered 2-way radio communication device 2. A one-to-one comparison of FIG. 4D (separable communication device 2) to FIG. 3D (integral communication device 1) shows that the overall thickness or depth of communication device 2 to be greater than that of embodiment 1 because of the volume required by the main body-to-power unit connecting-features and presence of the two housings of device embodiment 2.

FIG. 4C shows crank 20 as it engages flywheel dynamo generator 30. Further shown are supercapacitor 50 and speaker 90, as well as slidably-connecting electrical contacts 17A (of main body 15 and 17B (of power unit 16). Housing 12 has a front face 12B and a back face 12A, which are also seen in FIG. 4F.

FIG. 4D is a side-exposed or cut-away view showing housing front face 12A on the left and back housing face 12B on the right, along with crank handle 20. Crank arm handle 22 is rotatably mounted on an end of crank arm 22. Crank 20 is in a resting position along back housing face 12B of power unit 16. Crank handle 23 is tucked into a handle stowage site 25-2 within housing back face 12B.

Figure 4E:
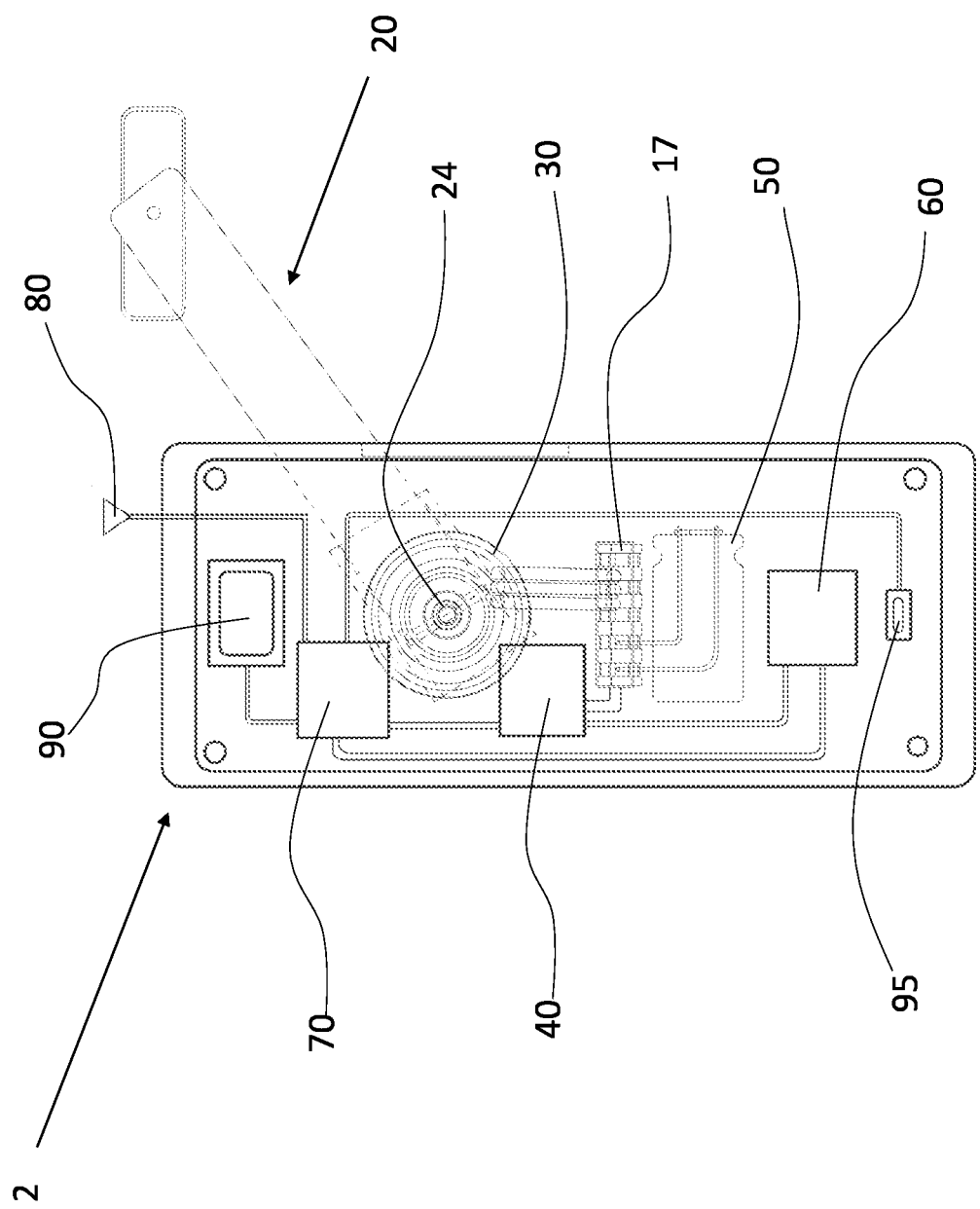
FIG. 4E is an exposed front and partially-transparent view of a manually-powered 2-way radio communication device, the device arranged into a main body and a power unit.

FIG. 4E is an exposed front and partially-transparent view of a manually-powered 2-way digital radio communication device 2, the device arranged into a main body 15 and a power unit 16. Crank 20, in a mid-crank position is shown in the background, the base of which can be seen engaging flywheel dynamo generator 30. Further shown within the interior of communication device 2 are power supply 40, supercapacitor 50, and modem 70. Antenna 80, speaker 90, and microphone 95 are shown as being connected to modem 70.

Figure 4F:
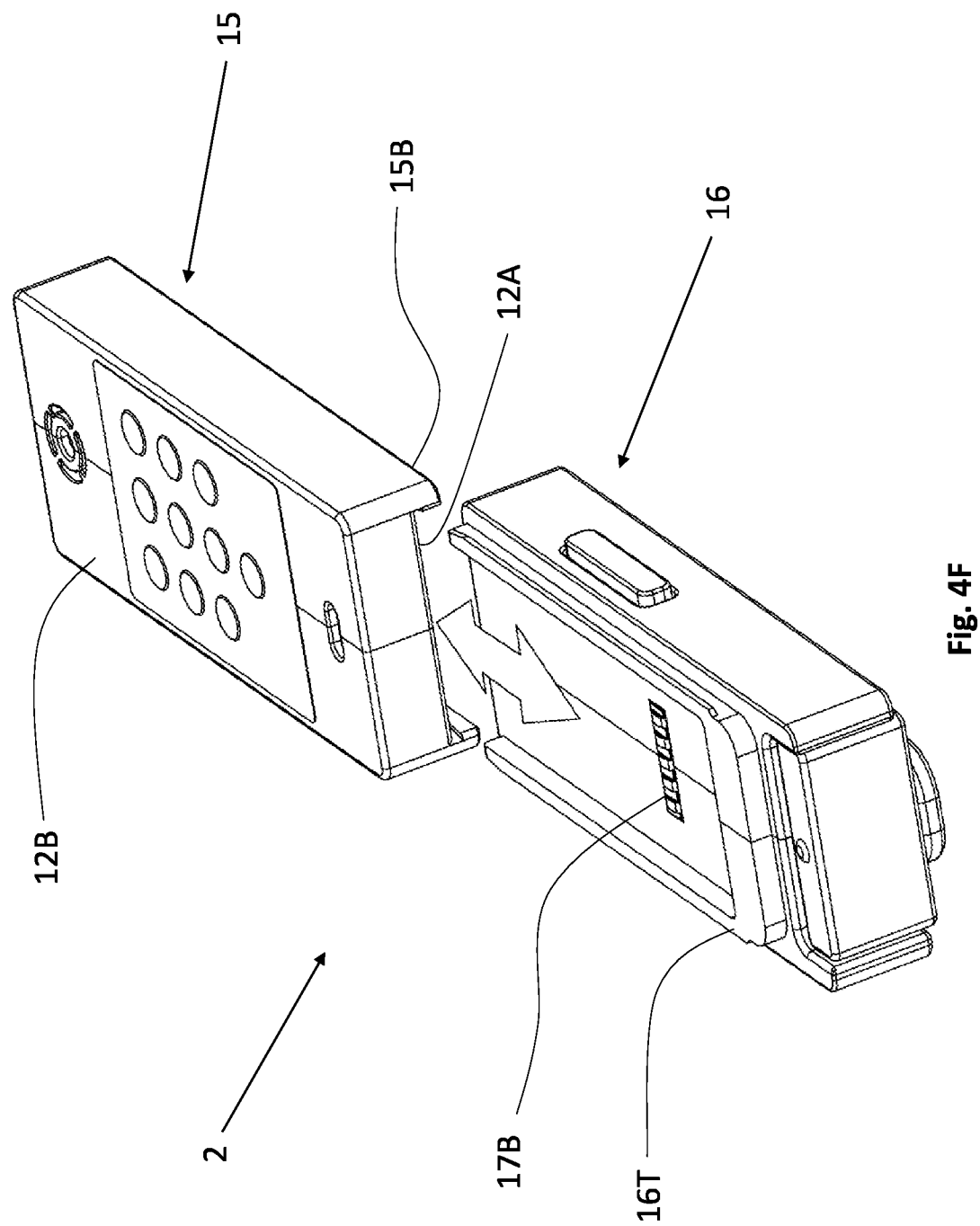
FIG. 4F is a front perspective view of a manually-powered 2-way radio communication device, showing the separability of the main body and the power unit, the device arranged into a main body and a power unit.

FIG. 4F is a front perspective view of manually powered 2-way radio communication device 2 showing the separability of main body 15 and power unit 16. Main body 15 has a front face 12B and a back face 12A; back face 12A aligns against power unit 16. In this particular example of a connecting/disconnecting arrangement, the top surface 16T of power unit 16 is configured to slide into (and out of) the bottom surface 15B of main body 15. When power unit 16 is positioned within main body 15 in this manner, connectors 17A of the main body and 17B of the power unit are engaged (FIG. 2 is a block diagram that depicts connectors 17A and 17B). When main body 15 and power unit 16 are connected in this manner, manually-powered 2-way digital radio communication device 2 is substantially identical to manually-powered 2-way digital radio communication device 1. When power unit 16 is slidably removed from main body 15, connectors 17A and 17B are disconnected.

Figure 5A:
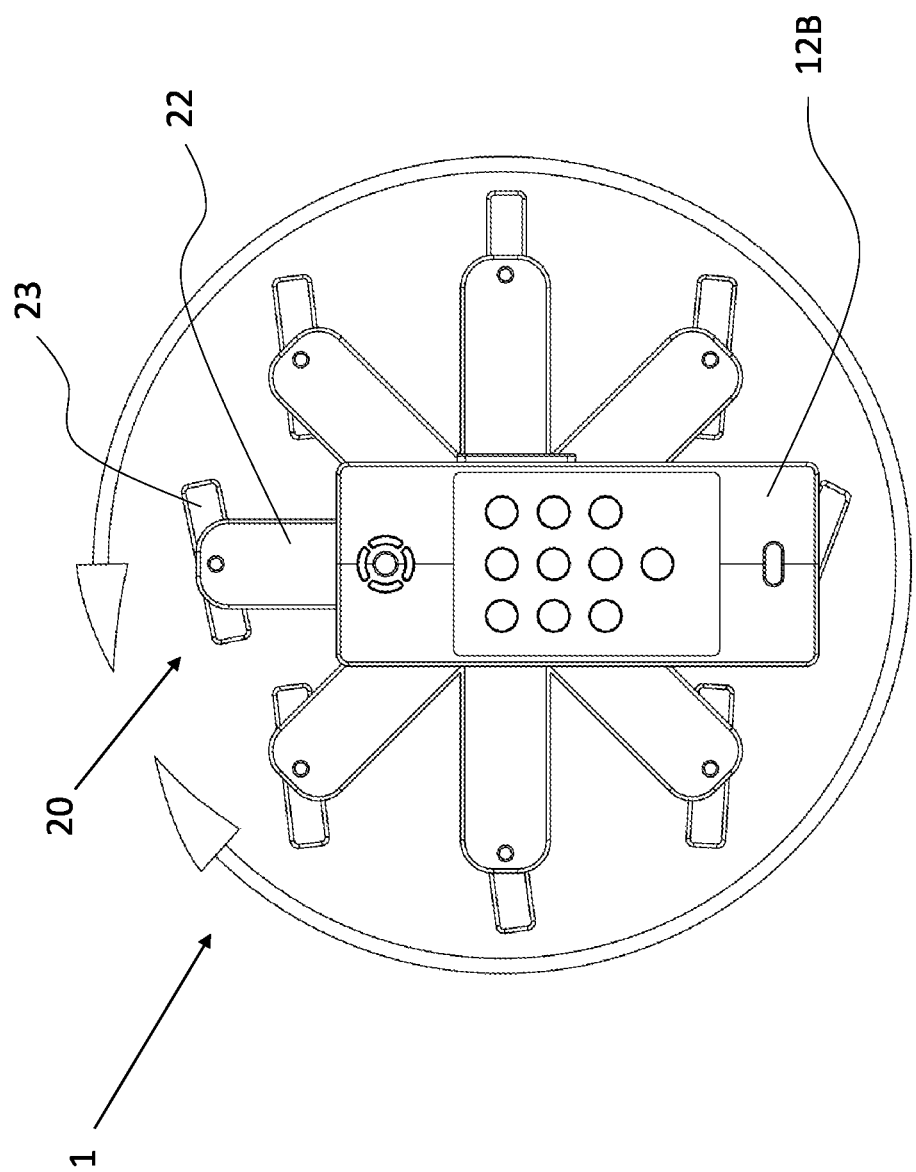
FIG. 5A is a front view of the manually-powered 2-way radio communication device, showing, in particular, the rotation of the crank with respect to the housing; this image depicts both the integral embodiment and the modular embodiment, as the front view of both embodiments are the same.
Figure 5B:
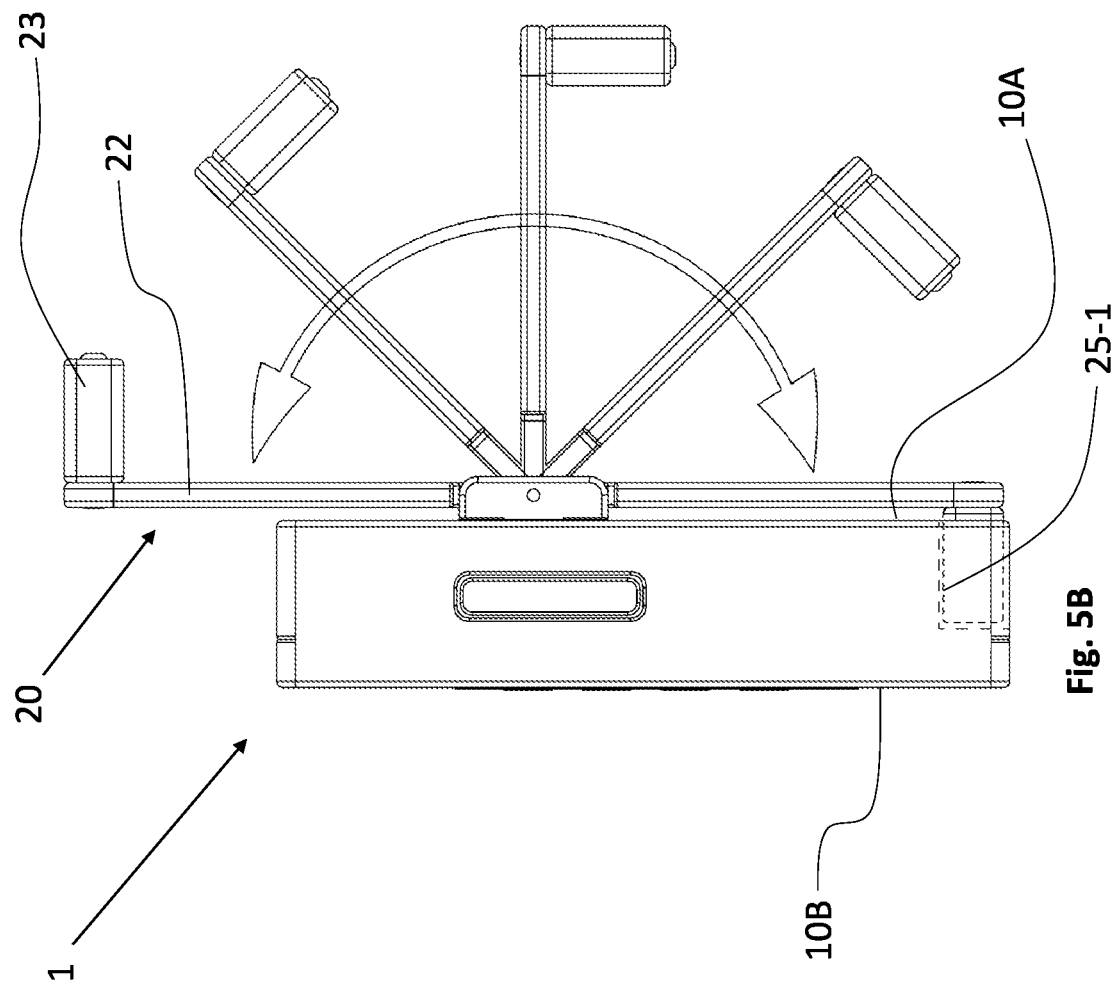
FIG. 5B is a side view of the manually-powered 2-way radio communication device, showing in particular, the stowability of the crank with respect to the housing; this view depicts the integral embodiment.
Figure 5C:
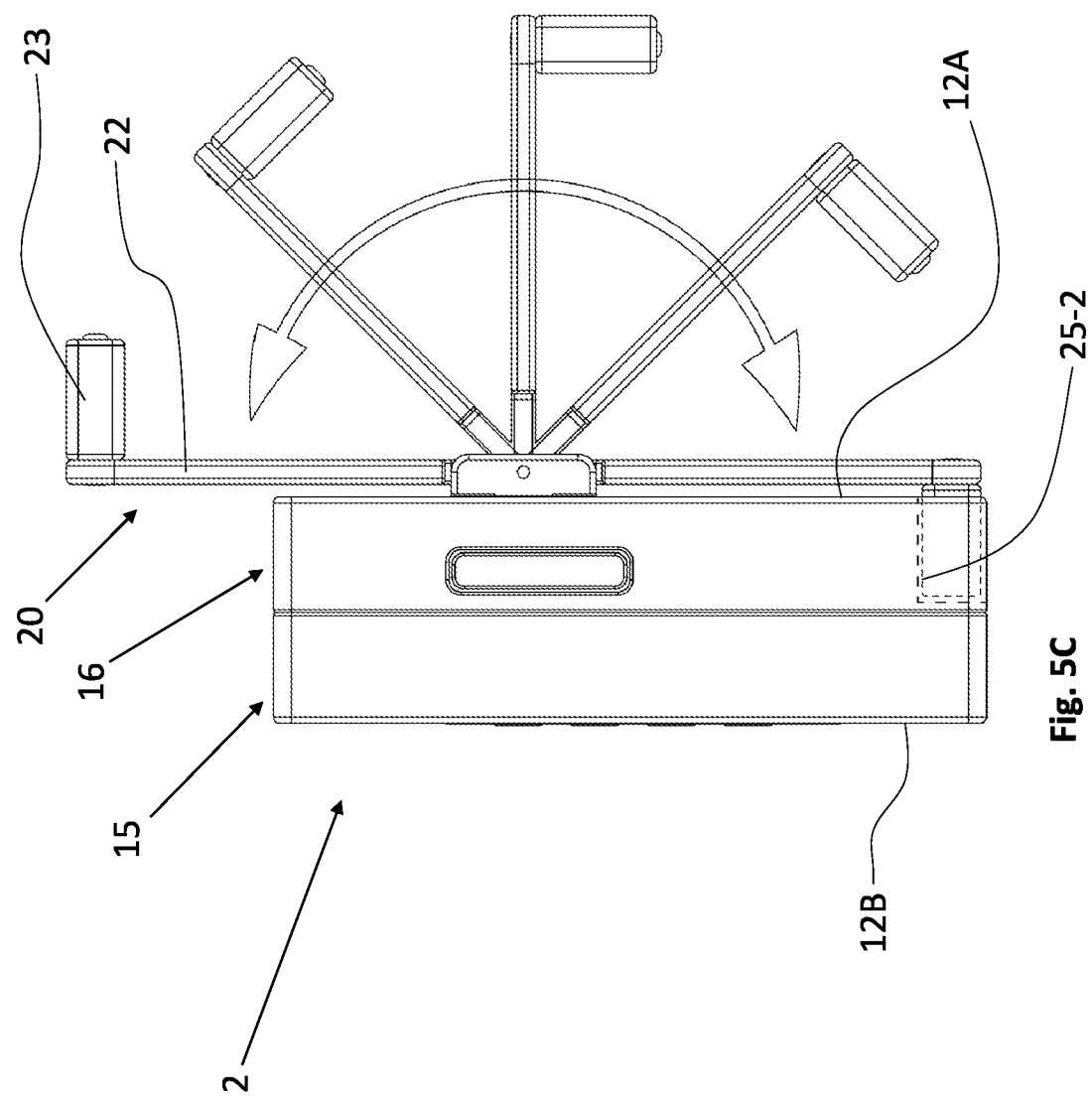
FIG. 5C is a side view of the manually-powered 2-way radio communication device, showing in particular, the stowability of the crank with respect to the housing; this view depicts the integral embodiment.

FIGS. 5A-5C show views of both embodiments of manually powered 2-way radio communication device 1 (and 2), showing, in particular, the arrangement and operation of crank 20 with respect to the communication device as a whole.

FIG. 5A is a front view of the manually powered 2-way radio communication device, showing the rotational arc (semi-circular arrow) of crank 20 with respect to the device as a whole. FIG. 5A depicts both integrated communication device 1 and modular communication device 2, as the front views of both embodiments are the same. The position of crank 20 at the top of the arc is an operating position, from which the crank can be turned in either direction (clockwise or counterclockwise). The position of crank 20 at the bottom of the arc is a resting position, in which handle 23 is stowed within stowage site 25-1.

FIG. 5B is a side view of the manually powered 2-way radio communication device 1 (the integral embodiment), showing in particular, the stowability of the crank with respect to the device as a whole. FIG. 5C is a side view of the manually powered 2-way radio communication device 2 (the separable or modular embodiment) in a manner similar to that of FIG. 4B, showing in particular, the stowability of the crank within the housing. In their respective side views, as seen, integral communication device 1 (FIG. 5B) and communication device 2 (FIG. 5C) as depicted, differ only in the relative thickness or depth of the devices.

1. Embodiments of a manually-powered 2-way radio communication device include: (a) a manually operable crank; (b) a dynamo flywheel generator arranged to receive energy input from the manually operable crank; (c) a low wattage power supply, wherein the power supply is operably connected to the dynamo flywheel and receives energy directly therefrom; (d) a supercapacitor including a power storage sufficient to operate the mobile telephone without continuous manual input, and wherein the capacitor receives energy from the power supply; and (e) a power microprocessor operably connected to the supercapacitor and able to receive energy input therefrom, and wherein the microprocessor is sufficiently efficient to operate solely with energy from the supercapacitor, and wherein, in some embodiments, the microprocessor is an 8-bit low power microprocessor; and (f) a low power radio modem that is operably connected to the microprocessor, and arranged to receive energy therefrom.

2. In various embodiments of the manually-powered 2-way radio communication device of embodiment 1, the device includes any of a cellular mobile telephone, a satellite phone, a text messaging-only cellular or satellite phone, or a walkie-talkie.

3. In various embodiments of the manually-powered 2-way radio communication device of embodiment 1, the device includes any of Bluetooth communication capability, global positioning satellite communication capability, or internet access capability.

4. In various embodiments of the manually-powered 2-way radio communication device of embodiment 1, the communication received and transmitted by the device consists of audio communication.

5. In various embodiments of the manually-powered 2-way radio communication device of embodiment 1, the communication received and transmitted by the device includes text-based communication.

6. In various embodiments of the manually-powered 2-way radio communication device of embodiment 5, the received text-based communication is translated into audio speech.

7. In some embodiments of the manually-powered 2-way radio communication device of embodiment 1 the crank, the generator, and the supercapacitor are all included in a power unit portion of the device, and wherein the power supply, microprocessor, and modem are included in a main body portion of the device, and wherein the main body portion of the device and the power unit portion of the device are integrated within a single housing. In the detailed description, this embodiment is referred to as "radio communication device embodiment 1", in contrast to "radio communication device 2, per embodiment 6, below.

8. In some embodiments of the manually-powered 2-way radio communication device of embodiment 4 the manually operable crank and the single housing are mutually configured such that the crank is stowable within the single housing.

9. In some embodiments of the manually-powered 2-way radio communication device of embodiment 1 the crank, the generator, and the supercapacitor are all included in a power unit portion of the device, and wherein the power supply, microprocessor, and modem are included in a main body portion of the device, and wherein the main body portion of the device and the power unit portion of the device are mateable and separable. In the detailed description, this embodiment is referred to as "radio communication device embodiment 2".

10. In some embodiments of the manually-powered 2-way radio communication device of embodiment 6 the power unit, when detached from the main body, is operably connectable to the main body of a suitably configured main body of a second manually-powered 2-way communication radio device.

11. In some embodiments of the manually-powered 2-way radio communication embodiment of 6 the manually operable crank and the single housing are mutually configured such that the crank is stowable within the single integral housing.

12. In some embodiments of the manually-powered 2-way radio communication device of embodiment 1 the power unit portion of the device and the main body of the device are two separate components, operably connectable but separable, and the each of the two separate components are enclosed within its own housing.

13. In some embodiments of the manually-powered 2-way communication radio device of embodiment 12 the manually operable crank and the power unit housing are mutually configured such that the crank is stowable within the power unit's housing.

14. In some embodiments of the manually-powered 2-way radio communication device of embodiment 1 the wattage of the low wattage generator power supply is less than or equal to about 2 watts.

15. In some embodiments of the manually-powered 2-way radio communication device of embodiment 14 the wattage of the low wattage generator power supply is less than or equal to about 1 watt.

16. In some embodiments of the manually-powered 2-way radio communication device of embodiment 1, the device further include an antenna, a speaker, and a microphone that are operably connected to the modem.

17. In some embodiments of the manually-powered 2-way radio communication device of embodiment 16 the wattage of the low wattage generator power supply is sufficient to operate the antenna, an audio-out function of the speaker, an audio-in function of the microphone, and an input device.

18. In some embodiments of the manually-powered 2-way radio communication device of embodiment 17 the input device includes a touch screen for user input and readout.

19. In some embodiments of the manually-powered 2-way radio communication device of embodiment 16, the input device is able to show a text message.

20. In some embodiments of the manually-powered 2-way radio communication device of embodiment 1 power originating from the crank is transferred directly from the flywheel dynamo to the power supply without an intervening battery.

21. In some embodiments of the manually-powered 2-way radio communication device of embodiment 1 supercapacitor (SC) has a capacitance greater than that of an electrolytic capacitor, and has a charging rate greater than that of a battery.

22. In some embodiments of the manually-powered 2-way radio communication device of embodiment 1 the microprocessor includes a bare metal firmware code.

23. In some embodiments of the manually-powered 2-way radio communication device of embodiment 1 a fully-powering cranking time yields a device operating time that is at least three-fold longer than the fully-powering cranking time.

24. The manually-powered 2-way radio communication device of embodiment 23 wherein a fully-powering cranking time yields a device operating time that is at least five-fold longer than the fully-powering cranking time.

25. The manually-powered 2-way radio communication device of embodiment 23 wherein a fully-powering cranking time yields a device operating time that is at least ten-fold longer than the fully-powering cranking time.

26. In some embodiments of the manually-powered 2-way radio communication device of embodiment 1 an energy efficiency and a high operating time to cranking time ratio is realized from multiple factors, said factors including:
(a) a direct transfer of power from the dynamo to the power supply, (b) a fast-charging supercapacitor, (c) a low power radio modem and a low power microprocessor, and (d) a microprocessor having bare metal firmware.

27. Embodiments of a manually-powered 2-way radio communication device include: (a) a manually operable crank; (b) a dynamo flywheel generator arranged to receive energy input from the manually operable crank; (c) a low wattage power supply, wherein the power supply is operably connected to the dynamo flywheel and receives energy directly therefrom; (d) a supercapacitor including a power storage sufficient to operate the mobile telephone without continuous manual input, and wherein the capacitor receives energy from the power supply; and (e) a power microprocessor operably connected to the supercapacitor and able to receive energy input therefrom, and wherein the microprocessor is sufficiently efficient to operate solely with energy from the supercapacitor, and wherein, in some embodiments, the microprocessor is an 8-bit low power microprocessor; and (f) a low power radio modem that is operably connected to the microprocessor, and arranged to receive energy therefrom, wherein the 2-way radio communication device is able to communicate with a second 2-way radio communication device by way of receiving incoming data from the second device and transmitting outgoing data to the second device, and wherein the incoming data and the outgoing data include text message signals only.

28. Embodiments of a method of operating a manually-powered 2-way radio communication device include: (a) receiving kinetic energy by way of a manually operable crank; (b) transferring the kinetic energy from the manually operable crank to a dynamo flywheel generator and rendering into a 3-phase electrical energy; (c) transferring the electrical energy from the dynamo flywheel generator to a 3-phase AC/DC power supply and rendering it into DC electrical energy; (d) transferring the DC electrical energy from the 3-phase AC/DC power supply to a supercapacitor; (e) transferring DC electrical energy from the supercapacitor to a low power microprocessor (an 8-bit low power microprocessor, by way of example); (f) transferring DC electrical energy from the 8-bit low power microprocessor to a low power radio modem; and (g) operating functions of the communication device by way of the modem.

29. Some embodiments of the method of operating a manually-powered 2-way radio communication device according to embodiment 28 including operating functions of the communication device by way of the modem includes: (a) conveying electrical energy from the modem to an antenna, and, in return, conveying an audio signal from the antenna to the modem, and (b) conveying electrical energy from the modem to a microphone, and, in return, conveying an audio signal from the microphone to the modem, and (c) conveying electrical energy from the modem to a speaker, and, in return, conveying an audio signal from the speaker to the modem.

30. Some embodiments of the method of operating a manually-powered 2-way radio communication device according to embodiment 28 including operating functions of the communication device by way of the modem includes: (a) conveying electrical energy from the modem to an antenna, and, in return, conveying a text-message signal from the antenna to the modem, and (b) conveying electrical energy from the modem to a microphone, and, in return, conveying a text-message signal from the microphone to the modem, and (c) conveying electrical energy from the modem to a speaker, and, in return, conveying a text-message signal from the speaker to the modem.

31. Some embodiments of the method of operating a manually-powered 2-way radio communication device according to embodiment 28 include operating the communication device by way of operating functions by way of the microprocessor, wherein microprocessor functions include: (a) conveying electrical energy from the microprocessor to an input device, and, in return, conveying a signal from the input device to the microprocessor, and (b) conveying electrical energy from the microprocessor to a microphone, and, in return, conveying an audio signal from the microphone to the microprocessor.

32. Some embodiments of the method of operating a manually-powered 2-way radio communication device according to embodiment 31, wherein the input device includes a touch screen, and wherein operating the communication device includes sending a touchscreen signal from the input device to the microprocessor.

33. Some embodiments of the method of operating a manually-powered 2-way radio communication device according to embodiment 28 includes operating with a wattage of less than or equal to about 2 watts from the power supply.

34. Some embodiments of the method of operating a manually-powered 2-way radio communication device according to embodiment 33 include operating with a wattage of less than or equal to about 1 watt from the power supply.

35. Some embodiments of the method of operating a manually-powered 2-way radio communication device according to embodiment 28 wherein transferring energy from the flywheel dynamo to the power supply includes transferring energy directly, without transferring energy to a battery intervening between the flywheel dynamo and the power supply.

36. Some embodiments of the method of operating a manually-powered 2-way radio communication device according to embodiment 28 include the supercapacitor having a capacitance greater than that of an electrolytic capacitor, and having a charging rate greater than that of a battery.

37. Some embodiments of the method of operating a manually-powered 2-way radio communication device according to embodiment 28 include the microprocessor having a bare metal firmware code.

Any one or more features or steps of any device or method embodiment of the inventions disclosed herein can be combined with any one or more other features of any other described embodiment of the invention, without departing from the scope of the invention. It should also be understood that the inventions are not limited to the embodiments that are described or depicted herein for purposes of exemplification, but are to be defined only by a fair reading of claims appended to the patent application, including the full range of equivalency to which each element thereof is entitled. Some theoretical considerations of the inventors may have been advanced in this application; these theoretical considerations are offered strictly for the purpose of conveying concepts underlying the inventions, not to support any of the claims, all of which stand wholly independent of any theoretical considerations.

The invention claimed is:
1. A manually-powered 2-way radio communication device comprising:
 a manually operable crank;
 a dynamo flywheel generator arranged to receive energy input from the manually operable crank;

a low wattage power supply, wherein the power supply is operably connected to the dynamo flywheel and receives energy directly therefrom;

a supercapacitor comprising a power storage sufficient to operate the communication device without continuous manual input, and wherein the supercapacitor receives energy from the power supply;

a low power-microprocessor operably connected to the supercapacitor and able to receive energy input therefrom, and wherein the microprocessor is sufficiently efficient to operate solely with energy from the supercapacitor; and a low power radio modem that is operably connected to the microprocessor, and arranged to receive energy therefrom.

2. The manually-powered 2-way radio communication device of claim 1, wherein the communication device comprises any of: a cellular mobile telephone, a satellite phone, or a walkie-talkie.

3. The manually-powered 2-way radio communication device of claim 1, wherein the communication device comprises any of: Bluetooth communication capability, global positioning satellite communication capability, or internet access capability.

4. The manually-powered 2-way radio communication device of claim 1, wherein the communication received and transmitted by the communication device comprises audio communication.

5. The manually-powered 2-way radio communication device of claim 1, wherein the communication received and transmitted by the communication device comprises text message based communication.

6. The manually-powered 2-way radio communication device of claim 1, wherein the manually operable crank, the dynamo flywheel generator, and the supercapacitor are all included in a power unit portion of the communication device, and wherein the power supply, microprocessor, and modem are included in a main body portion of the communication device, and wherein the main body portion of the communication device and the power unit portion of the communication device are integrated within a single housing.

7. The manually-powered 2-way radio communication device of claim 6, wherein the manually operable crank and the single housing are mutually configured such that the manually operable crank is stowable within the single housing.

8. The manually-powered 2-way radio communication device of claim 1, wherein the manually operable crank, the dynamo flywheel generator, and the supercapacitor are all included in a power unit portion of the communication device, and wherein the power supply, microprocessor, and modem are included in a main body portion of the communication device, and wherein the main body portion of the communication device and the power unit portion of the communication device are mateable and separable.

9. The manually-powered 2-way radio communication device of claim 8, wherein the power unit portion, when detached from the main body portion, is operably connectable to the main body portion of a suitably configured main body of a second manually-powered 2-way communication radio device.

10. The manually-powered 2-way radio communication device of claim 8, wherein the power unit portion of the communication device and the main body portion of the communication device are two separate components, operably connectable but separable, and wherein the each of the two separate components are enclosed within its own housing.

11. The manually-powered 2-way radio communication device of claim 1, wherein a wattage of the low wattage power supply is about 2 watts or less.

12. The manually-powered 2-way radio communication device of claim 11, wherein a wattage of the low wattage power supply is about 1 watt or less.

13. The manually-powered 2-way radio communication device of claim 1, further comprising an antenna, a speaker, and a microphone that are operably connected to the modem.

14. The manually-powered 2-way radio communication device of claim 13, wherein a wattage of the low wattage power supply is sufficient to operate the antenna, an audio-out function of the speaker, an audio-in function of the microphone, and an input device.

15. The manually-powered 2-way radio communication device of claim 1, wherein power originating from the manually operable crank is transferred directly from the dynamo flywheel generator to the power supply without an intervening battery.

16. The manually-powered 2-way radio communication device of claim 1, wherein the supercapacitor comprises a capacitance greater than that of an electrolytic capacitor, and comprises a charging rate greater than that of a battery.

17. The manually-powered 2-way radio communication device of claim 1, wherein the low power microprocessor comprises a bare metal firmware code.

18. The manually-powered 2-way radio communication device of claim 1, wherein an energy efficiency and a high operating time to cranking time ratio is based on one or more of: a direct transfer of power from the dynamo flywheel generator to the low wattage power supply; the supercapacitor; the low power radio modem and the low power microprocessor; or the microprocessor comprising bare metal firmware.

19. A manually-powered 2-way radio communication device comprising:

a manually operable crank;

a dynamo flywheel generator arranged to receive energy input from the manually operable crank;

a low wattage power supply, wherein the power supply is operably connected to the dynamo flywheel generator and receives energy directly therefrom;

a supercapacitor comprising a power storage sufficient to operate the communication device without continuous manual input, and wherein the supercapacitor receives energy from the power supply;

a low power-microprocessor operably connected to the supercapacitor and able to receive energy input therefrom, and wherein the microprocessor is sufficiently efficient to operate solely with energy from the supercapacitor; and a low power radio modem that is operably connected to the microprocessor, and arranged to receive energy therefrom, wherein the communication device is able to communicate with a second 2-way radio communication device by way of receiving incoming data from the second device and transmitting outgoing data to the second device, and wherein the incoming data and the outgoing data consist of text message signals.

20. A method of operating a manually-powered 2-way radio communication device comprising:

receiving kinetic energy by way of a manually operable crank;

transferring the kinetic energy from the manually operable crank to a dynamo flywheel generator and rendering into a 3-phase electrical energy;

transferring the 3-phase electrical energy from the dynamo flywheel generator to a 3-phase AC/DC power supply and rendering it into DC electrical energy;

transferring the DC electrical energy from the 3-phase AC/DC power supply to a supercapacitor;

transferring the DC electrical energy from the supercapacitor to a low power microprocessor;

transferring the DC electrical energy from the low power microprocessor to a low power radio modem; and operating functions of the communication device by way of the modem.

* * * * *